UNITED STATES PATENT OFFICE.

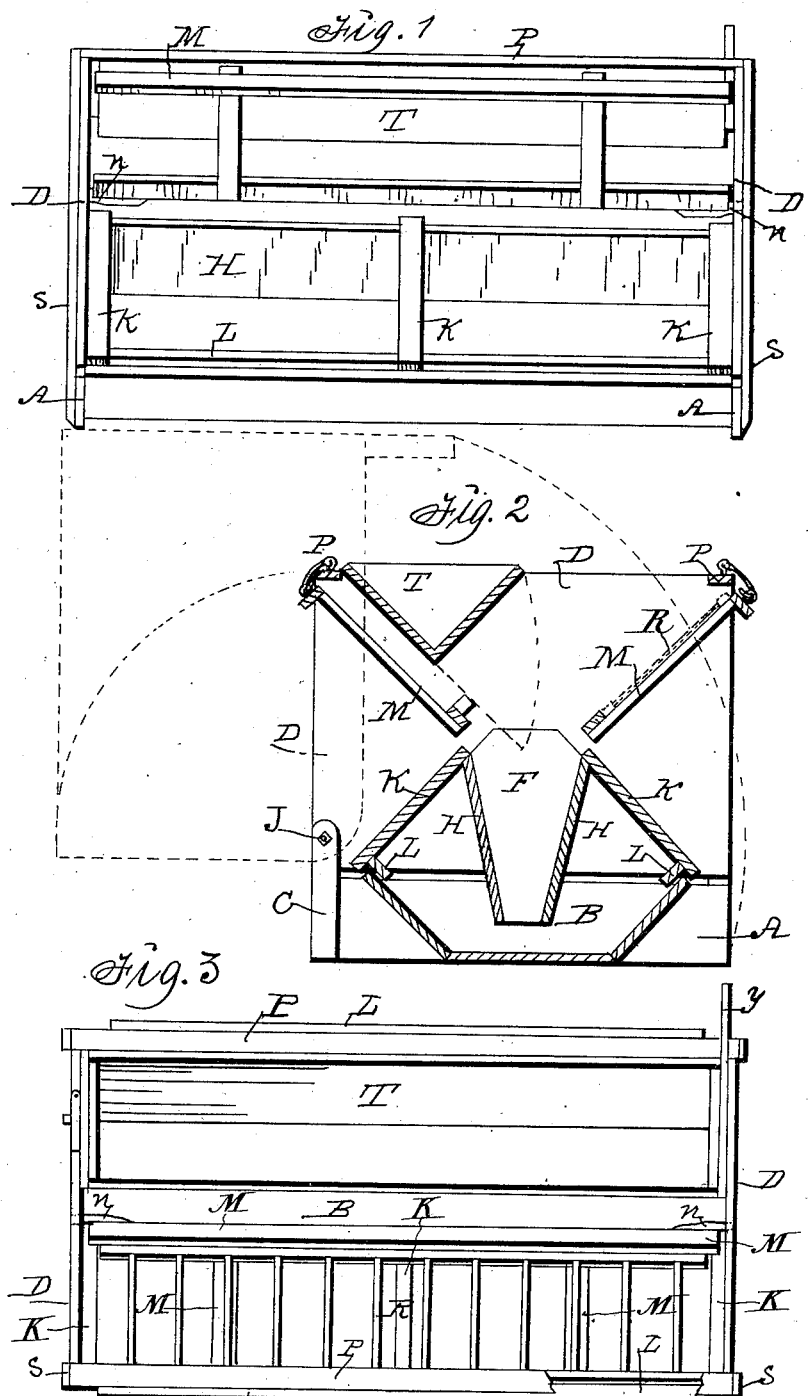

FRANK B. DAVIS, OF AUDUBON, IOWA.

PORTABLE AND ADJUSTABLE STOCK-FEEDER.

SPECIFICATION forming part of Letters Patent No. 663,806, dated December 11, 1900.

Application filed September 11, 1900. Serial No. 29,661. (No model.)

*To all whom it may concern:*

Be it known that I, FRANK B. DAVIS, a citizen of the United States, residing at Audubon, in the county of Audubon and State of Iowa, have invented a new and useful Portable and Adjustable Stock-Feeder, of which the following is a specification.

My object is to economize time and labor in feeding hogs, sheep, horses, and cattle and also to prevent waste of feed and to facilitate cleaning the feed-trough and preventing animals from getting their feet in the trough and fouling feed.

My invention consists in the construction, arrangement, and combination of a portable base, a fixed trough in the base, a frame hinged to the base, a fixed feed-receptacle in the frame, a trough pivoted in the frame, and adjustable feed-trough fenders, as hereinafter set forth, pointed out in my claims, and illustrated in the accompanying drawings, in which—

Figure 1 is a side elevation showing the adjustable trough-fender elevated. Fig. 2 is a transverse sectional view showing the relative positions of all the parts as required for advantageous use. Fig. 3 is a top view showing the pivoted trough in the top of the frame and an auxiliary removable fender adapted to serve as a hay-rack.

The letters A designate mating end pieces of the base, rigidly connected by means of a feed-trough B, to the ends of which trough they are fixed in such a manner that they serve as ends for the trough, and the trough is thereby made part of the base. Mating uprights C are fixed to the ends of the mating parts A of the base to reinforce them and to serve as means for hinging a frame on top of the base. Mating ends D have tapering pieces F fixed to their inside faces, and to the inclined edges are fixed boards H to rigidly connect the mating ends D as required to produce a frame and a chute that will extend down into the trough B from end to end. The frame thus produced is hinged to the top portions of the fixed uprights C by means of pivotal bolts J in such a manner that the frame can be readily turned upward into an inverted position, as indicated by dotted lines in Fig. 2, and as required for uncovering the feed-trough B to gain access thereto for cleaning it advantageously whenever necessary by the removal of corncobs or other waste matter that may accumulate in the trough.

A plurality of braces K are fixed to the top edges of the mating parts H of the hinged frame and to bars L, that in their normal positions overlie and protect the top edge portions of the parallel sides of the trough B, as shown in Fig. 2.

Adjustable fenders M are pivoted, by means of journals $n$ at their top corners, to the ends D of the frame in such a manner that they can be turned upward and detachably fastened to bars P, fixed to the corners of the ends D of the frame, by means of hooks and eyes or in any suitable way, for supporting an auxiliary fender, as indicated by dotted lines in Fig. 2, so it can be utilized as a hay-rack whenever desired.

R is the movable auxiliary fender, that can be advantageously used as a hay-rack in the top of the frame or combined with a hinged fender M to subdivide the spaces, as required to keep the heads of animals separated from each other when feeding from the trough B.

The auxiliary fender R is not shown in Fig. 1 and only indicated by dotted lines in Fig. 2 and on the right side of said figure, where it will be retained in place when laid on the hinged fender M to serve as a hay-rack without being fastened.

Cleats S, fixed to the outside faces of the hinged frame to extend from top to bottom and to project down over the outsides of the mating parts A of the base, aid in strengthening the frame and in preventing lateral motion of the frame when resting upon the base and while animals are feeding.

A trough T, adapted for containing slops or liquid food, is pivoted to the top and rear portions of the mating end parts D of the hinged frame and provided with a fixed handle $y$ in such a manner that food can be placed in said trough and from thence advantageously emptied into the trough B by simply inverting the pivoted trough.

Having described the construction, purpose, and operation of my invention, its practical utility will be obvious to persons familiar with the art to which it pertains, and what I claim as new, and desire to secure by Letters Patent, is—

1. In a stock-feeder, a base consisting of two mating end pieces and a feed-trough fixed to the inside faces and central portions of said mating pieces and uprights fixed to the ends and outsides of said mating pieces for hinging a frame thereto, a frame adapted for supporting fenders fitted on top of the base and pivotally connected with said uprights, arranged and combined to operate in the manner set forth for the purposes stated.

2. In a stock-feeder, a base consisting of two mating end pieces and a feed-trough fixed to the inside faces and central portions of said mating pieces and uprights fixed to the ends and outsides of said mating pieces for hinging a frame thereto, a frame fitted on top of the base and pivotally connected with said uprights, a chute fixed to the ends of said pivoted frame for conveying feed to the trough in the lower part and center of the frame, and adjustable fenders extending from the top of the chute to the top edges of the trough, arranged and combined to operate in the manner set forth for the purposes stated.

3. An adjustable stock-feeder comprising a base composed of two mating end pieces and a trough, uprights fixed to the corner of the base, a frame composed of two mating end pieces and a chute fixed to said end pieces fitted on top of the base and hinged to said fixed uprights, fenders pivoted to the ends of the hinged frame to extend from the top of the chute to the top of the trough, means for detachably fastening the pivoted fenders to the top portions of the hinged frames for supporting auxiliary fenders, movable auxiliary fenders adapted to serve as hay-racks and a trough pivoted in the top and rear end portion of the hinged frame, arranged and combined to operate in the manner set forth for the purposes stated.

FRANK B. DAVIS.

Witnesses:
F. W. WALSMITH,
J. S. MARSTON.